United States Patent Office 2,711,412
Patented June 21, 1955

2,711,412

DIOXOPIPERIDINES

Karl Hoffmann, Binningen, and Eugen Tagmann, Therwil, Switzerland, assignors to Ciba Pharmaceutical Products, Inc., Summit, N. J.

No Drawing. Application February 4, 1954, Serial No. 408,308

Claims priority, application Switzerland February 13, 1951

3 Claims. (Cl. 260—281)

This application is a continuation-in-part of our co-pending application Serial Number 269,896, filed on February 4, 1952, now Patent No. 2,673,205.

The present invention relates to 2:6-dioxo-piperidines of the formula

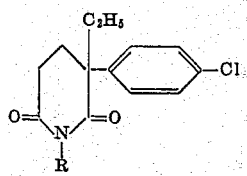

wherein R is a hydrogen or a lower alkyl group, especially a methyl group.

These new compounds possess valuable pharmacological properties and may be used as medicaments. They have a pronounced anti-convulsive effect; especially effective is the 3-p-chlorophenyl-3-ethyl-2:6-dioxo-piperidine. This effect was tested in mice and rats against shocks produced in different ways. Both the electroshock and the shock due to pentamethylene tetrazole were relieved with doses which are too small to produce general toxic symptoms. Spasms due to strychnine or sound irritation can also be suppressed.

According to the invention the specified dioxo-piperidines are obtained when 2-p-chloro-phenyl-2-ethyl-pentane-1:5-diacid or its functional derivatives by treatment with condensing agents, such as sulfuric acid, are converted into its cyclic imides. According to one feature of the invention the said pentane-1:5-diacid or its functional derivatives such as its halides, are reacted with ammonia or lower alkyl amines.

The N-unsubstituted dioxo-piperidine obtained according to the above process may subsequently be substituted in 1-position, by reaction with a lower alkyl halide in the presence of an alkaline metal, for example sodium, lithium, or an amide thereof.

The following examples illustrate the invention, the relation between part by weight and part by volume being the same as that between the gram and the cubic centimeter. Temperatures are expressed in degrees centigrade.

Example 1

A mixture of 26.5 parts by weight of 2-p-chlorophenyl-2-ethyl-pentane-1,5-diacid-monomethyl ester-mono-nitrile (1), 50 parts by volume of glacial acetic acid and 3.5 parts by volume of 85 per cent sulfuric acid is heated to 90–105° C. for 30 minutes and is then refluxed for 3 hours. Most of the solvent is distilled under reduced pressure and the residue is poured on an ice-water mixture. The precipitate is collected by filtration, washed with water, dissolved in ether and the ethereal solution washed with aqueous sodium bicarbonate in order to remove acidic contaminants. The ether-layer is dried over magnesium sulfate, filtered and the solvent removed.

The residue, after recrystallisation from i-propylalcohol, melts at 108–109° C. and consists of 3-p-chlorophenyl-3-ethyl-2:6-dioxo-piperidine of the formula

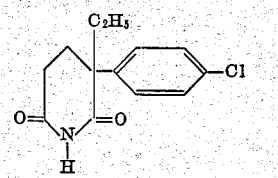

Example 2

To a solution of 25.2 parts by weight of 3-p-chlorophenyl-3-ethyl-2:6-dioxo-piperidine in 100 parts by volume of dry dioxane there are added in an atmosphere of dry nitrogen 5 parts by weight of powdered sodamide. The mixture is refluxed for 2 hours whereupon it is cooled and transferred into a pressure bottle, mixed with 18 parts by weight of methyliodide and, after sealing the bottle, heated to 110–120° C. for 5 hours. To the cooled mixture a few milliliters of methanol are added and the dioxane is distilled under reduced pressure. The residue is dissolved in ether, the ethereal solution is washed with dilute sodium bicarbonate solution and water, dried over magnesium sulfate and the solvent is removed. The remaining oil is distilled in vacuo. The 1-methyl-3-p-chlor-phenyl-2:6-dioxo-piperidine of the formula

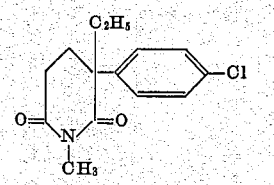

boils at 135–142° C. under 0.17 mm. pressure.

What is claimed is:
1. A compound of the formula

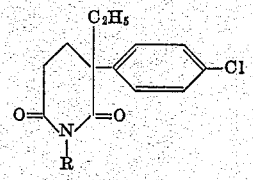

wherein R is a member selected from the group consisting of hydrogen and methyl.
2. 3-p-chlorophenyl-3-ethyl-2:6-dioxo-piperidine.
3. 1-methyl-3-p-chlorophenyl-3-ethyl-2:6-dioxo-piperidine.

References Cited in the file of this patent

UNITED STATES PATENTS 2,664,424      Hoffmann et al. _____ Dec. 29, 1953